United States Patent
Kerrigan et al.

(10) Patent No.: US 10,564,315 B2
(45) Date of Patent: Feb. 18, 2020

(54) METHODS FOR LOCATION IDENTIFICATION OF RENEWABLE ENERGY SYSTEMS

(71) Applicant: Locus Energy, Inc., Hoboken, NJ (US)

(72) Inventors: Shawn Kerrigan, Redwood City, CA (US); Michael Herzig, Edgewater, NJ (US); Matthew Williams, San Francisco, CA (US)

(73) Assignee: Locus Energy, Inc., Hoboken, NJ (US)

( * ) Notice: Subject to any disclaimer, the term of this patent is extended or adjusted under 35 U.S.C. 154(b) by 448 days.

(21) Appl. No.: 13/623,232

(22) Filed: Sep. 20, 2012

(65) Prior Publication Data

US 2013/0166211 A1 Jun. 27, 2013
US 2016/0363695 A9 Dec. 15, 2016

Related U.S. Application Data

(63) Continuation-in-part of application No. 12/777,235, filed on May 10, 2010, now Pat. No. 8,862,432.
(Continued)

(51) Int. Cl.
*G01V 99/00* (2009.01)
*G06Q 50/06* (2012.01)

(52) U.S. Cl.
CPC ............ *G01V 99/00* (2013.01); *G06Q 50/06* (2013.01)

(58) Field of Classification Search
CPC ...................................................... G01V 99/00
(Continued)

(56) References Cited

U.S. PATENT DOCUMENTS 3,872,286 A 3/1975 Putman
4,280,061 A 7/1981 Lawson-Tancred
(Continued)

FOREIGN PATENT DOCUMENTS

WO 0225987 A2 3/2002
WO 2006119031 11/2006
WO WO 2006/119113 11/2006

OTHER PUBLICATIONS

Hammer et al. 432,2005 Solar Energy Assessment Using Remote Sensing Technologies Remore Sensing of Environment 86, pp. 423-432, 2005.
(Continued)

*Primary Examiner* — Lina M Cordero
(74) *Attorney, Agent, or Firm* — Sheridan Ross PC

(57) ABSTRACT

A computer processor implemented method of identifying the location of a renewable energy system; providing a set of renewable energy systems having at least two location-known renewable energy systems each having a longitude and latitude pair and production data; providing at least one location-unknown renewable energy system in a computer processor; correlating by a computer processor each location-unknown renewable energy system to at least one location-known renewable energy system according to location-known renewable energy systems longitude and latitude pair and production data; providing a best-fit location for each location-unknown renewable energy system by triangulating the location-unknown renewable energy system to provide a triangulated latitude and longitude; setting the triangulated latitude and longitude for the location-unknown renewable energy system to become a location-known renewable energy system that is part of the set of renewable energy systems.

5 Claims, 13 Drawing Sheets

Related U.S. Application Data

(60) Provisional application No. 61/576,315, filed on Dec. 15, 2011.

(58) Field of Classification Search
USPC .................................................. 702/5
See application file for complete search history.

(56) References Cited

U.S. PATENT DOCUMENTS

| | | |
|---|---|---|
| 4,752,697 A | 6/1988 | Lyons |
| 4,779,980 A | 10/1988 | Hulstrom et al. |
| 6,311,137 B1 | 10/2001 | Kurokami |
| 6,799,047 B1* | 9/2004 | Bahl et al. ............... 455/456.1 |
| 6,975,925 B1* | 12/2005 | Barnes .................. F03D 7/048 700/286 |
| 7,020,566 B2 | 3/2006 | Villicana |
| 7,133,787 B2 | 11/2006 | Mizumaki |
| 7,471,243 B2* | 12/2008 | Roslak ........................ 342/463 |
| 7,742,897 B2* | 6/2010 | Herzig ........................ 702/182 |
| 8,265,776 B2* | 9/2012 | Osann, Jr. .............. G05B 15/02 700/22 |
| 8,335,731 B1* | 12/2012 | Heller ..................... G06Q 40/00 705/35 |
| 8,504,325 B2 | 8/2013 | Kerrigan et al. |
| 8,682,585 B1 | 3/2014 | Hoff |
| 8,738,328 B2 | 5/2014 | Kerrigan et al. |
| 8,761,948 B1* | 6/2014 | Ippolito .................. H02J 3/382 174/364 |
| 8,972,221 B2 | 3/2015 | Kerrigan et al. |
| 9,322,951 B2 | 4/2016 | Herzig et al. |
| 9,606,168 B2 | 3/2017 | Kerrigan et al. |
| 9,686,122 B2 | 6/2017 | Herzig et al. |
| 2002/0033020 A1 | 3/2002 | Tonomura |
| 2002/0143693 A1 | 10/2002 | Soestbergen |
| 2004/0067746 A1 | 4/2004 | Johnson |
| 2004/0103056 A1 | 5/2004 | Ikeda |
| 2004/0138977 A1 | 7/2004 | Tomkins |
| 2004/0148336 A1 | 7/2004 | Hubbard et al. |
| 2004/0176965 A1 | 9/2004 | Winch |
| 2004/0177027 A1 | 9/2004 | Adachi |
| 2004/0230377 A1 | 11/2004 | Ghosh |
| 2004/0236587 A1 | 11/2004 | Nalawade |
| 2005/0004839 A1 | 1/2005 | Bakker |
| 2005/0043866 A1 | 2/2005 | Litchfield et al. |
| 2005/0131810 A1 | 6/2005 | Garrett |
| 2005/0192780 A1* | 9/2005 | Mertins .................. G06Q 50/06 703/1 |
| 2006/0173623 A1* | 8/2006 | Grzych .................. G06Q 10/04 702/3 |
| 2006/0271214 A1 | 11/2006 | Brown |
| 2007/0112530 A1* | 5/2007 | Kamen .................. C02F 1/008 702/61 |
| 2007/0162367 A1 | 7/2007 | Smith |
| 2007/0174219 A1 | 7/2007 | Bryant |
| 2007/0203860 A1 | 8/2007 | Golden |
| 2007/0219932 A1 | 9/2007 | Carroll |
| 2007/0226163 A1 | 9/2007 | Robles |
| 2008/0091590 A1 | 4/2008 | Kremen |
| 2008/0091625 A1 | 4/2008 | Kremen |
| 2008/0172256 A1 | 7/2008 | Yekutiely |
| 2008/0215500 A1 | 9/2008 | De |
| 2009/0088991 A1* | 4/2009 | Brzezowski ............ G01D 4/00 702/62 |
| 2009/0177458 A1 | 7/2009 | Hochart |
| 2009/0259429 A1* | 10/2009 | Elisiussen ............... F03D 7/042 702/113 |
| 2010/0080703 A1* | 4/2010 | Chen ...................... F03D 7/042 416/1 |
| 2010/0219983 A1 | 9/2010 | Peleg |
| 2010/0271222 A1* | 10/2010 | Kerrigan et al. ............ 340/635 |
| 2010/0318297 A1* | 12/2010 | Herzig ................. H02J 13/0062 702/3 |
| 2010/0329542 A1* | 12/2010 | Ramalingam et al. ....... 382/154 |
| 2011/0166787 A1 | 7/2011 | Tencer et al. |
| 2011/0282601 A1 | 11/2011 | Hoff |
| 2011/0307109 A1 | 12/2011 | Sri-Jayantha |
| 2012/0072139 A1* | 3/2012 | Reed .................... G01R 31/001 702/59 |
| 2012/0310855 A1 | 12/2012 | Adams et al. |
| 2013/0085885 A1 | 4/2013 | Sahai |
| 2015/0177415 A1 | 6/2015 | Bing |
| 2015/0309207 A1 | 10/2015 | Kerrigan et al. |
| 2016/0026740 A1 | 1/2016 | Herzig et al. |
| 2016/0306906 A1 | 10/2016 | McBrearty et al. |
| 2017/0257255 A1 | 9/2017 | Herzig et al. |

OTHER PUBLICATIONS

Kroposki et al.Photovoltaic Module Energy Rating Methodology Development 25th PVSC, May 13-17, 1996.

'Atlas DCA', Peak electronic design, ltd., 2008.

Burger, Werner, Asset Securitisation, 2006, pp. 1-67.

Li, Danny HW, and Tony NT Lam. "Determining the optimum tilt angle and orientation for solar energy collection based on measured solar radiance data." International Journal of Photoenergy 2007 (2007).

Wang, Jianhui, The Application of Grey System Theory in Asset Securitizaton, 2007, pp. 1-3.

Dazhi et al., "PV Asia Pacific Conference 2011: The Estimation of Clear Sky Global Horizontal Irradiance at the Equator," Energy Procedia, vol. 25, 2012, pp. 141-148.

Lorenz et al., "Irradiance Forecasting for the Power Prediction of Gird-Connected Photovoltaic Systems," IEEE Journal of Selected Topics in Applied Earth Observations in Remote Sensing, vol. 2, No. 1, Mar. 2009, 9 pages.

Prusa et al., "Performance of a Small Network of Grid Interactive, Residential Solar Photovoltaic Systems," Proceedings of Energy Sustainability 2008, ES2008-54124, Aug. 10-14, 2008, 9 pages.

Reno et al., "Global Horizontal Irradiance Clear Sky Models: Implementation and Analysis," Sandia National Laboratories, Report No. SAND2012-2389, Mar. 2012, 68 pages.

Official Action for U.S. Appl. No. 11/949,035, dated Oct. 6, 2009, 14 pages.

Notice of Allowance for U.S. Appl. No. 11/949,035, dated Feb. 12, 2010, 4 pages.

Official Action for U.S. Appl. No. 12/777,221, dated Dec. 28, 2011, 7 pages.

Notice of Allowance for U.S. Appl. No. 12/777,221, dated Feb. 3, 2012, 7 pages.

Official Action for U.S. Appl. No. 13/455,871, dated Jun. 26, 2012, 7 pages.

Official Action for U.S. Appl. No. 13/455,871, dated Dec. 3, 2012, 7 pages.

Notice of Allowance for U.S. Appl. No. 13/455,871, dated Apr. 15, 2013, 8 pages.

Official Action for U.S. Appl. No. 13/927,506, dated Oct. 3, 2013, 7 pages.

Notice of Allowance for U.S. Appl. No. 13/927,506, dated Mar. 3, 2014, 6 pages.

Official Action for U.S. Appl. No. 12/777,224, dated Oct. 11, 2013, 6 pages. Restriction Requirement.

Notice of Allowance for U.S. Appl. No. 12/777,224, dated Dec. 26, 2013, 10 pages.

Official Action for U.S. Appl. No. 13/363,924, dated Jun. 27, 2014, 7 pages.

Notice of Allowance for U.S. Appl. No. 13/363,924, dated Oct. 27, 2014, 7 pages.

Notice of Allowance for U.S. Appl. No. 13/623,240, dated Dec. 29, 2014, 13 pages.

Official Action for U.S. Appl. No. 13/623,240, dated Jun. 4, 2015, 5 pages.

Notice of Allowance for U.S. Appl. No. 13/623,240, dated Jan. 6, 2016, 9 pages.

Official Action for U.S. Appl. No. 14/791,312, dated Sep. 11, 2017, 8 pages.

Official Action for U.S. Appl. No. 14/791,312, dated Jan. 25, 2018, 8 pages.

(56) References Cited

OTHER PUBLICATIONS

Official Action for U.S. Appl. No. 14/791,312, dated Dec. 14, 2018, 7 pages.
Official Action for U.S. Appl. No. 14/194,858, dated Jun. 16, 2016, 6 pages.
Notice of Allowance for U.S. Appl. No. 14/194,858, dated Nov. 9, 2016, 5 pages.
Official Action for U.S. Appl. No. 15/196,519, dated Sep. 21, 2018, 6 pages.
Official Action for U.S. Appl. No. 15/196,519, dated Apr. 5, 2019, 6 pages.
Official Action for U.S. Appl. No. 12/777,235, dated Sep. 27, 2013, 8 pages.
Official Action for U.S. Appl. No. 12/777,235, dated Apr. 23, 2014, 6 pages.
Notice of Allowance for U.S. Appl. No. 12/777,235, dated Aug. 15, 2014, 5 pages.
Official Action for U.S. Appl. No. 14/791,308, dated Oct. 22, 2015, 6 pages. Restriction Requirement.
Official Action for U.S. Appl. No. 14/791,308, dated Feb. 5, 2016, 18 pages.
Official Action for U.S. Appl. No. 14/791,308, dated Aug. 8, 2016, 19 pages.
Official Action for U.S. Appl. No. 14/791,308, dated Dec. 14, 2016, 17 pages.
Official Action for U.S. Appl. No. 14/791,308, dated May 11, 2017, 19 pages.
Official Action for U.S. Appl. No. 14/791,308, dated Sep. 1, 2017, 17 pages.
Official Action for U.S. Appl. No. 14/791,308, dated Feb. 20, 2018, 13 pages.
Official Action for U.S. Appl. No. 14/791,308, dated Aug. 29, 2018, 14 pages.
Official Action for U.S. Appl. No. 14/791,308, dated Jan. 8, 2019, 19 pages.
Official Action for U.S. Appl. No. 13/681,803, dated Mar. 18, 2015, 18 pages.
Official Action for U.S. Appl. No. 13/681,803, dated Sep. 16, 2015, 19 pages.
Official Action for U.S. Appl. No. 13/681,803, dated Sep. 16, 2016, 16 pages.
Official Action for U.S. Appl. No. 13/681,803, dated Mar. 27, 2017, 12 pages.
Official Action for U.S. Appl. No. 14/791,312, dated Apr. 16, 2019, 9 pages.
Achleitner et al., "SIPS: Solar Irradiance Prediction System," IPSN-14 Proceedings of the 13th International Symposium on Information Processing in Sensor Networks, Apr. 15-17, 2014, pp. 225-236.
Applasamy, "Methods for Deriving Solar Radiation from Satellite Data in Malaysia," 2011 IEEE Symposium on Business, Engineering and Industrial Applications (ISBEIA), Langkawi, Malaysia, Sep. 25-28, 2011, pp. 208-213.
Notice of Allowance for U.S. Appl. No. 14/791,312, dated Jul. 17, 2019, 10 pages.
Notice of Allowance for U.S. Appl. No. 15/196,519, dated Jul. 3, 2019, 9 pages.

\* cited by examiner

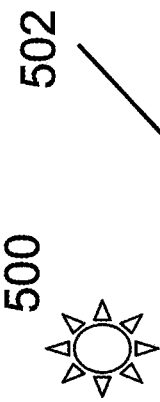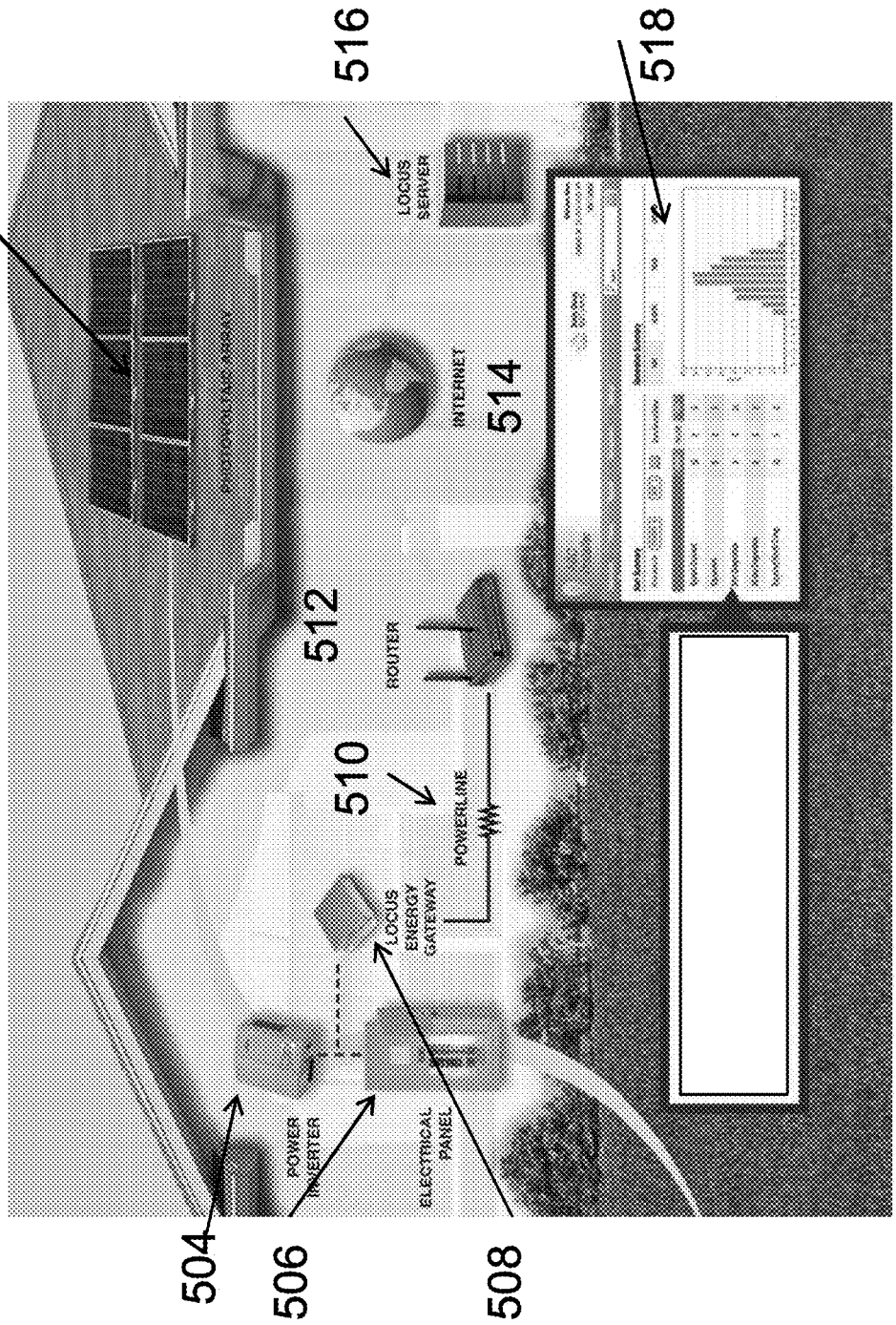
Figure 5

METHODS FOR LOCATION IDENTIFICATION OF RENEWABLE ENERGY SYSTEMS

This application claims priority to Provisional Patent Application No. 61/576,315 filed Dec. 15, 2011 entitled "Methods for Location Identification of Renewable Energy Systems and Environmental Sensors from Energy Production and Sensor Measurements," and is a continuation-in part of U.S. patent application Ser. No. 12/777,235 filed May 10, 2010, now U.S. Pat. No. 8,862,432, which are incorporated herein by reference.

One of the greatest obstacles to adoption of distributed renewable energy projects is the ability to efficiently monitor and analyze a fleet of systems. There currently exist several monitoring solutions with analytics based on geospatial relationships. While geospatial analytics have proven effective in monitoring, location among other variables describing renewable energy systems and environmental sensors are user inputs and subject to human error. When systems are incorrectly located it is difficult to employ analytical algorithms reliant upon geospatial data due to the errors caused in systems within the incorrectly located region. It is difficult to accurately monitor and analyze a fleet of projects with these errors, thus the need for methodology for correctly identifying the location of incorrectly located renewable energy systems and environmental sensors.

In order to efficiently manage and operate renewable energy projects, energy production must be monitored and analyzed. Several solutions to this problem currently exist, employing monitoring hardware on location and running analytical algorithms on the data. Due to the similarity of environmental conditions experienced within a region, renewable energy production and environmental sensor observations are typically similar across a region. This relationship allows implementation of geospatial algorithms for analysis of a fleet of renewable energy projects.

The process of deploying renewable energy systems and environmental sensors in the field involves several parties including OEMs, financiers, and distributors among others. Many of these parties have interest in monitoring their systems, although they may be several layers away from the end user. Due to the separation, interested parties may have partially complete or incorrect information about these systems. This separation can limit the benefits associated with monitoring and analyzing renewable energy projects, thus the need for methodology to accurately locate the projects and environmental sensors.

This present invention provides methodologies for locating renewable energy systems based on energy production and environmental sensors based on sensor observations. A correlation based methodology leverages a renewable energy project network with known locations in order identify a project's latitude and longitude. This correlation based methodology can also be used to identify an environmental sensor's latitude and longitude by leveraging an environmental sensor network. Another correlation based methodology leverages a renewable energy system's respective production model and iterates through latitude and longitude in order to identify the system's location. This correlation based methodology can also determine an environmental sensor's location by leveraging the respective environmental conditions model by iterating through latitude and longitude. An energy production skew based methodology leverages theoretically calculated solar noon in order to identify a PV system's longitude. A solar irradiance observation skew based methodology leverages theoretically calculated solar noon in order to identify a solar irradiance sensor's longitude.

These and other features, aspects and advantages of the present invention will become better understood with reference to the following description and claims.

SUMMARY OF THE INVENTION

The present invention relates generally to systems and methods for locating renewable energy systems based on energy production and environmental sensors based on sensor observations.

According to one embodiment of the present invention, a computer processor implemented method of identifying the location of a renewable energy system, the method comprising the steps of; providing a set of renewable energy systems having at least two location-known renewable energy systems each having a longitude and latitude pair and production data; storing the longitude and latitude pair and production data in a computer processor; providing at least one location-unknown renewable energy system in a computer processor; correlating by the computer processor each location-unknown renewable energy system to at least one location-known renewable energy system according to the location-known renewable energy systems longitude and latitude pair and production data; providing a best-fit location for each location-unknown renewable energy system by triangulating the location-unknown renewable energy system to provide a triangulated latitude and longitude; setting the triangulated latitude and longitude for the location-unknown renewable energy system to become a location-known renewable energy system that is part of the set of renewable energy systems.

According to another embodiment of the present invention, a computer processor implemented method of identifying the location of an environmental sensor, the method comprising the steps of; providing a set of environmental sensors having at least two location-known environmental sensors each having a longitude and latitude pair and sensor measurement data; storing the longitude and latitude pair and sensor measurement data in a computer processor; providing at least one location-unknown environmental sensor in a computer processor; correlating by a computer processor each location-unknown environmental sensor to at least one location-known environmental sensor according to the location-known renewable energy systems longitude and latitude pair and sensor measurement data; providing a best-fit location for each location-unknown environmental sensor by triangulating the location-unknown environmental sensor to provide a triangulated latitude and longitude; setting the triangulated latitude and longitude for the location-unknown environmental sensor to become a location-known environmental sensor that is part of the set of renewable energy systems.

According to another embodiment of the present invention, a computer processor implemented method of identifying the location of a renewable energy system is provided, the method comprising the steps of; providing a location-unknown renewable energy system having production data; storing the production data in a computer processor; filtering the production data day by day for favorable weather conditions by a computer processor to provide filtered production data for each filtered day; identifying and saving the start of production, peak of production and end of production for each filtered day in a computer processor; calculating solar noon for each filtered day by a computer processor; calculating longitude bias for each filtered day by a computer processor according to an equation of time and the peak of production; calculating skew of production by a computer processor according to the start of production, peak of production and end of production for each filtered day; calculating longitude for one location-unknown renewable energy system by a computer processor according to the longitude bias and skew of production for each filtered day; setting the longitude for the location-unknown renewable energy system to become a location-known renewable energy system that becomes part of a set of location-known renewable energy systems.

According to another embodiment of the present invention, a computer processor implemented method of identifying the location of an environmental sensor is provided, the method comprising the steps of; providing a set of environmental sensors having at least two location-known environmental sensors each having a longitude and latitude pair and sensor measurement data; storing the longitude and latitude pair and sensor measurement data in a computer processor; providing at least one location-unknown environmental sensor in a computer processor; correlating by the computer processor each location-unknown environmental sensor to at least one location-known environmental sensor according to the location-known renewable energy systems longitude and latitude pair and sensor measurement data; providing a best-fit location for each location-unknown environmental sensor by triangulating the location-unknown environmental sensor to provide a triangulated latitude and longitude; setting the triangulated latitude and longitude for the location-unknown environmental sensor to become a location-known environmental sensor that is part of the set of renewable energy systems.

These and other features, aspects and advantages of the present invention will become better understood with reference to the following description and claims.

BRIEF DESCRIPTION OF THE DRAWINGS

FIG. 5 depicts the present invention.

DETAILED DESCRIPTION OF THE INVENTION

Figure 1:
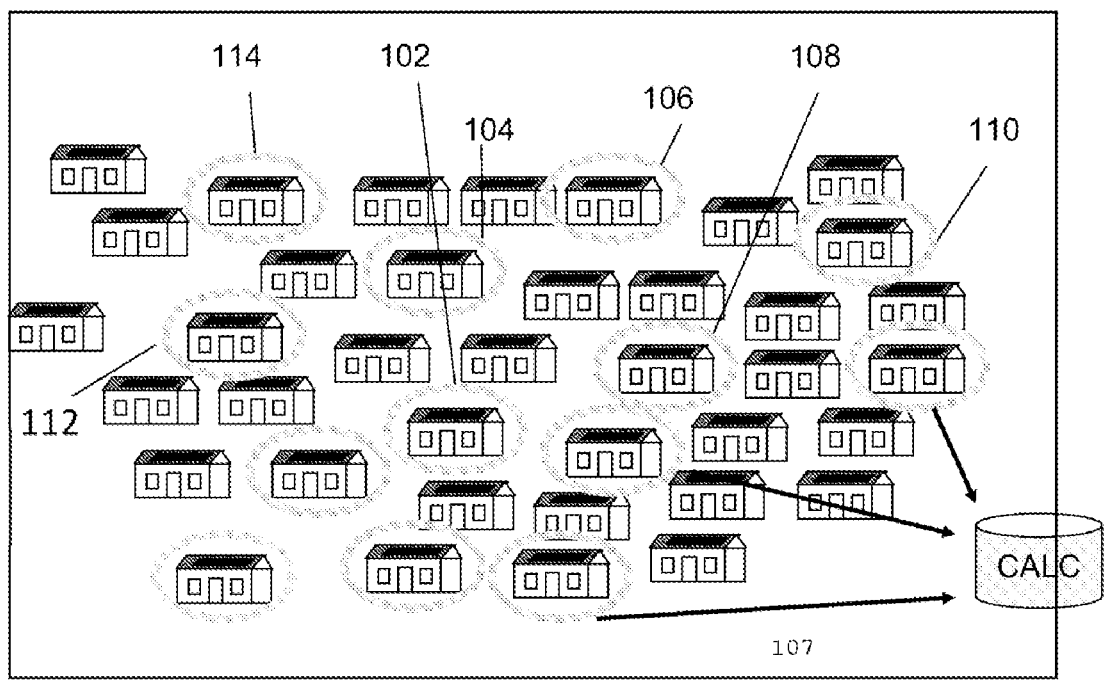
FIG. 1 depicts the present invention.
Figure 2:
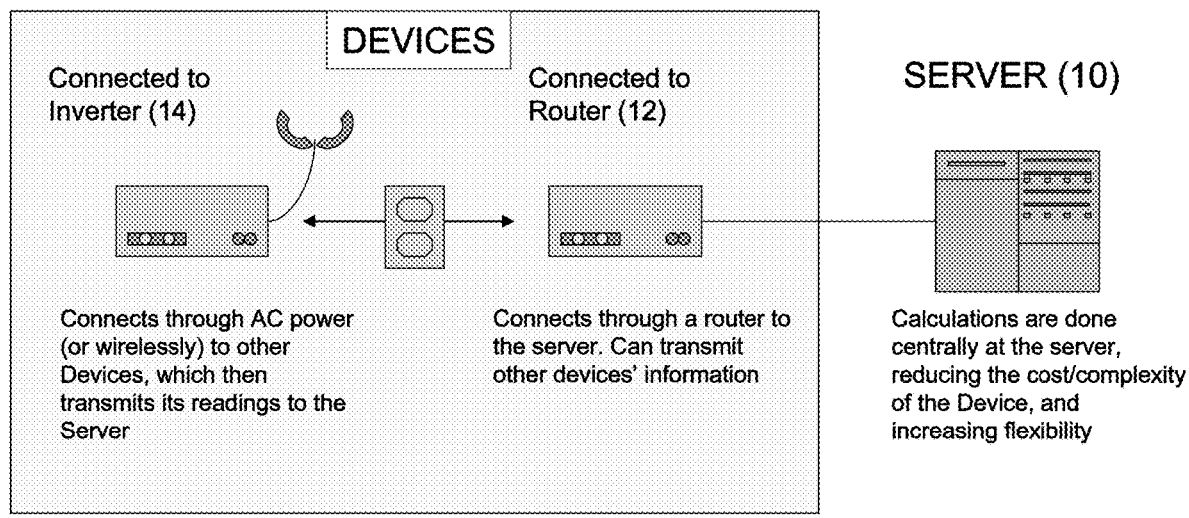
FIG. 2 depicts the present invention.
Figure 3:
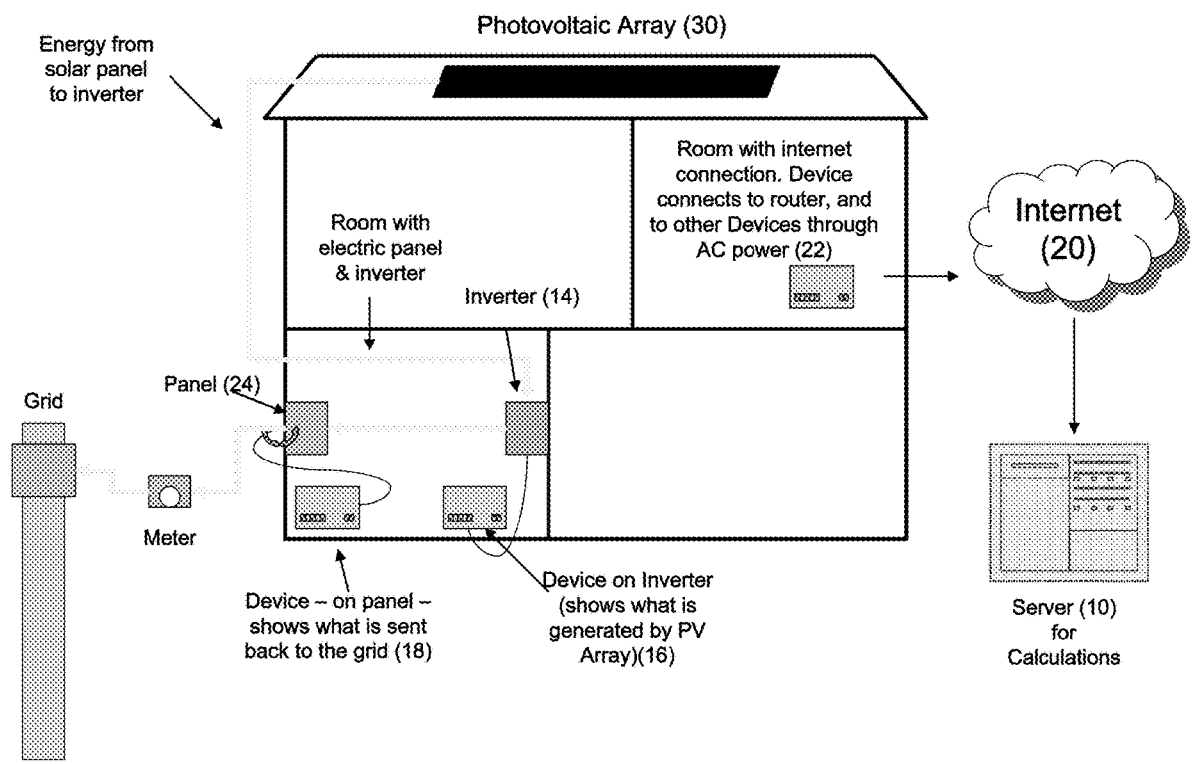
FIG. 3 depicts the present invention.
Figure 4:
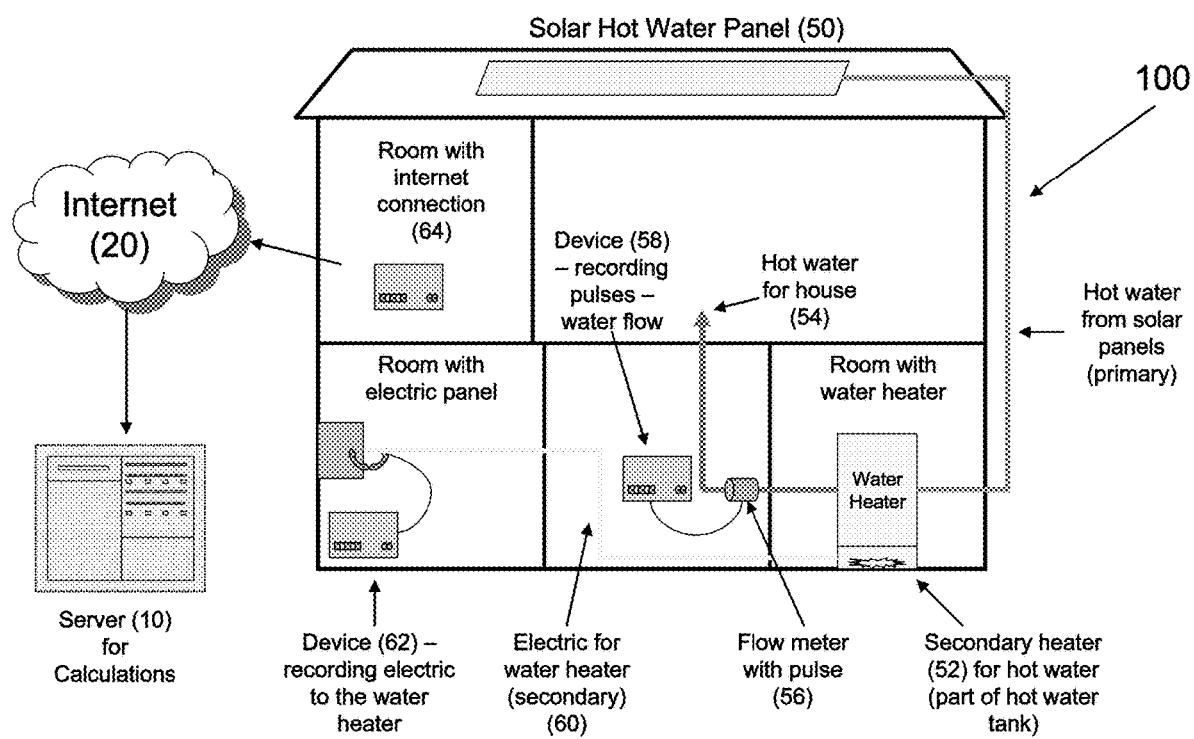
FIG. 4 depicts the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

FIGS. 1-5 provide examples of a monitored renewable energy system (more specifically a photovoltaic array solar energy panel also referred to herein as a solar photovoltaic system or solar powered system) from which information may be obtained. According to the example shown, there is a server 10 and at least one monitored renewable energy system (e.g. 102, 104, 106, 108, 110, 112) which is provided to a user or consumer. There may be at least one data server (10), at least one generation monitoring device (16) in communication with the monitored renewable energy system (at premise monitored renewable energy system (30)) and at least one communication node (22) in communication with at least one of the monitored renewable energy system (30), the generation monitoring device (16) and the data server (10). It should be understood the data server may be a single computer, a distributed network of computers, a dedicated server, any computer processor implemented device or a network of computer processor implemented devices, as would be appreciated by those of skill in the art. The monitored renewable energy system may have background constants that are entered into the system during data setup; populating this part of the data structure is one of the initial steps to the process. During this time, all required (or potentially required) background information may be loaded into the system. This data will later be used for system calculations and diagnostics. Background constants may include: (1) Full Calendar with sunrise and sunset according to latitude throughout the year; (2) Insolation or 'incident solar radiation': This is the actual amount of sunlight falling on a specific geographical location. There are expected amounts of radiation which will fall on an area each day, as well as an annual figure. Specific Insolation is calculated as kWh/m2/day. The importance of this variable is that it can combine several other Background Constants; and (3) Location Functionality. It is envisioned that some of this information may be input and some may be determined automatically. The proximity of each system to each other system may be determined, and forms a part of the methods used to determine the geographic average of the renewable energy systems. While there are different specific methods of implementing Location Functionality, generally this relies on a large database of locations which are tied to zones. Because the relational distances between the zones are stored within the software, the distances between any two locations can then be easily and accurately calculated.

The term production data refers to any data that is received from the renewable energy system. The energy generated by each monitored renewable energy system is recorded as production data and the data server may then determine comparative information based upon at least one of the background constant, the diagnostic variable, the system coefficient and the energy generated to determine a comparative value of the monitored renewable energy system. The term comparative value is intended to include any value that compares one system to another system or a group of systems. For example, this may be as simple as an "underperforming" designation when the system's performance is less than another system or group of systems performance in terms of power generated.

A sample system may have at least one inverter (14) in communication with the monitored renewable energy system (e.g. 50, 30). The inverter (14) is an electronic circuit that converts direct current (DC) to alternating current (AC). There may also be at least one return monitor (18) determining the energy returned to a grid by the at-least one monitored renewable energy system. At least one background constant may be determined and saved in the data server(s). The monitored renewable energy system (e.g. 30, 50) may be at least partially powered by at least one alternate energy source. There may be at least one generation monitoring device (e.g. 58), which calculates the energy generated at each consumer's premises by the monitored renewable energy system (e.g. 30, 50); at least one communication node (64) in communication with each at least one generation monitoring device (e.g. 58); at least one data server (10) in communication with communication node (e.g. 64), wherein the data server(s) (10) accept information from the communication node (e.g. 64) to determine the power generated at a first user's premises (100) and compare the power generated at a first user's premises (100) to Comparative Information obtained from at least two monitored renewable energy systems (e.g. 102, 104, 106, 108, 110, 112, 114) to determine if the first user's monitored renewable energy system (100) is within a predetermined deviation from the comparative information. This may provide a comparative value. The communication node may be further comprising a data storage means for storing usage information. For example, the communication node (64) may be a computer with a hard drive that acts as a data storage means for storing usage information. The generation monitoring device may be selected from the group consisting of pulse meter, temperature meter, electromechanical meter, solid state meter, flow meter, electric meter, energy meter and watt meter. There may also be at least one return monitoring device in communication with the inverter which calculates the energy returned to a grid by the system.

The monitored renewable energy system may be, for example, a solar system, solar panel system, photovoltaic, thermal, wind powered, geothermal, hydropower. A secondary energy source (e.g. 52) may be in communication with and at least partially powering the monitored renewable energy system. It should be understood, though, this is only for ancillary power in the event that the renewable energy source (50) is not capable of entirely powering the at premise monitored renewable energy system.

The generation monitoring device may be any type of meter, by way of example, this may include a pulse meter, temperature meter, electromechanical meter, solid state meter, flow meter, electric meter, energy meter and watt meter. An installation will have a communication node or hub set up at the location with the system. One of the communication nodes may act as a hub. These devices connect to the internet and send the data collected by the nodes to the Server. They have the following properties: The hub has a web server and connects to a standard internet connection (Ethernet). It does not require a computer or other device to make this connection. Each hub has its own unique IP or DNS address. The hub is configured by a web browser. The web browser allows the hub to have specific nodes assigned to it. This set up feature will allow another hub in the area to be set up with its own nodes so that all can operate wirelessly without disruption. Also, the hub is able to configure specific aspects of the hub, such as the connection with the server, data recording and time settings and the ability to configure the attached nodes, including their recording properties.

Each installation may have two or more Data Nodes. These are typically connected wirelessly to the Hub, and connected directly to the inputs/outputs from the Solar Hot Water system. They communicate constantly with the Hub, transferring data which the Hub then sends up to the server. They may have the following properties: The first Required Node connects to a flow meter attached to the Water Tank that is connected to the Solar Hot Water system. This Node will operate as a pulse meter, 'clicking' whenever a unit (either a gallon or a liter) of hot water passes from the tank. The second Required Node connects to either the electric panel at the switch for the Hot Water tank's electric power OR to a flow/other meter for gas/oil to the secondary heater for the Hot Water tank. The Node may have a data storage means for storing flow/usage information. Together, the data gathered from these Required Node connections allow the software on the serve to convert the utilized hot water into an accurate reading of utilized solar energy by subtracting the energy required to by the secondary heating mechanism. The term utilized generation refers to the energy generated by the at-premise power system, less any energy that has not been consumed by the at premise power system (e.g. the energy used to heat water that remains in the tank and is not subsequently used). Note that the term "at-premise power system" is one type of monitored renewable energy system, as claimed. There may also be other Nodes, which may be used to measure other aspects of the system and gain even more accurate readings. For example: the temperature of the hot water on an ongoing basis. The system may be monitored from a remote location (such as a computer in a different location).

The components node (100), hub (102) and server (10) make up the required core components needed to accurately measures the actual usable output from a Solar Hot Water (SHW) system. Essentially, the hub (102) connects to multiple nodes (100) which simultaneously measure the secondary power going into the system along with the hot water going out. Controlling for any background power requirements (e.g. for pumping), it can measure the usable BTUs created by solar by analyzing the measurements at the server (104) level.

The renewable energy system may be a solar system, solar panel system, photovoltaic, thermal, wind powered, geothermal, hydropower or any other renewable energy system. Also, the terms at-premises, on premises and at-premise are interchangeable and equivalent. Additionally, for those interested in heating and cooling their dwelling via renewable energy, geothermal heat pump systems that tap the constant temperature of the earth, which is around 7 to 15 degrees Celsius a few feet underground, are an option and save money over conventional natural gas and petroleum-fueled heat approaches.

The method may further comprise the steps of: monitoring the system from a remote location; and monitoring the utilized generation from a remote location. The method may comprise the steps of: generating an alert when the customer variables are a prescribed percentage different than historical averages. The method may also comprise the steps of monitoring and storing the consumer's customer variables and utilized generation.

The present invention provides a computer processor implemented method of identifying the location of a renewable energy system. The method comprising the steps of; providing a set of renewable energy systems (e.g. 102, 106, 108) having at least two location-known renewable energy systems each having a longitude and latitude pair and production data; storing the longitude and latitude pair and production data in a computer processor; providing at least one location-unknown renewable energy system in a computer processor; correlating by the computer processor each location-unknown renewable energy system to at least one location-known renewable energy system according to the location-known renewable energy systems longitude and latitude pair and production data; providing a best-fit location for each location-unknown renewable energy system by triangulating the location-unknown renewable energy system to provide a triangulated latitude and longitude; setting the triangulated latitude and longitude for the location-unknown renewable energy system to become a location-known renewable energy system that is part of the set of renewable energy systems.

Figure 7:
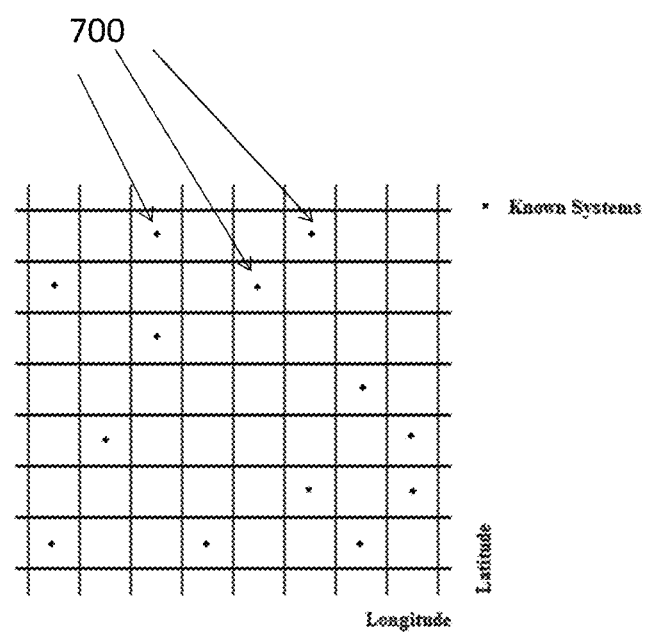
FIG. 7 depicts the present invention.
Figure 8:
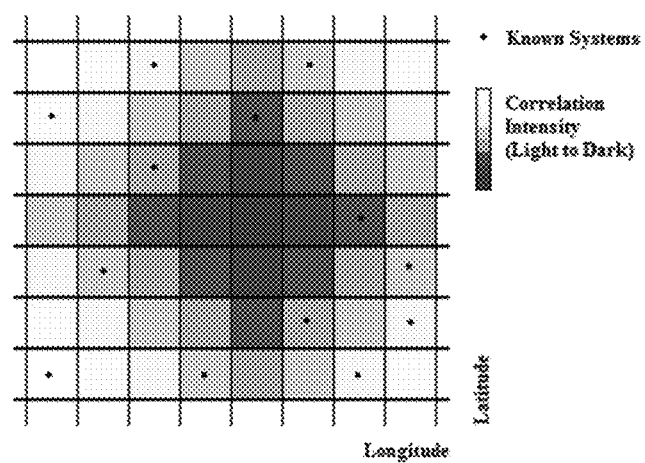
FIG. 8 depicts the present invention.
Figure 9:
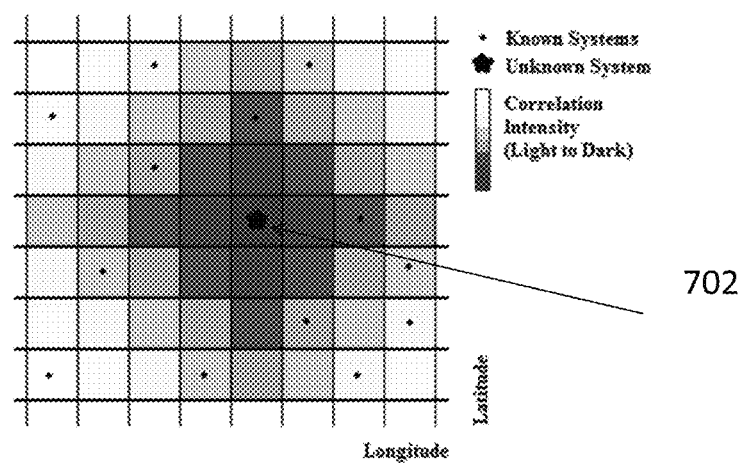
FIG. 9 depicts the present invention.

FIGS. 7-9 depict triangulation methods according to the present invention. As shown in FIG. 7, location known renewable energy systems (700) are marked on a longitude and latitude grid. A location unknown renewable energy system (702). One triangulation method may be to set the longitude and latitude to the highest correlated location known system's latitude and longitude. As shown in FIG. 8, the longitude and latitude pair and heat production data are stored in a computer processor. FIG. 9 depicts correlating a location-unknown renewable energy system (702) to at least one location-known renewable energy system (700). The step of correlating a location may be according to Geospatial interpolation methods, included but not limited to kriging, inverse distance weighting, bilinear interpolation, bicubic interpolation, Barnes interpolation, and spline interpolation (for latitude and longitude).

Figure 10:
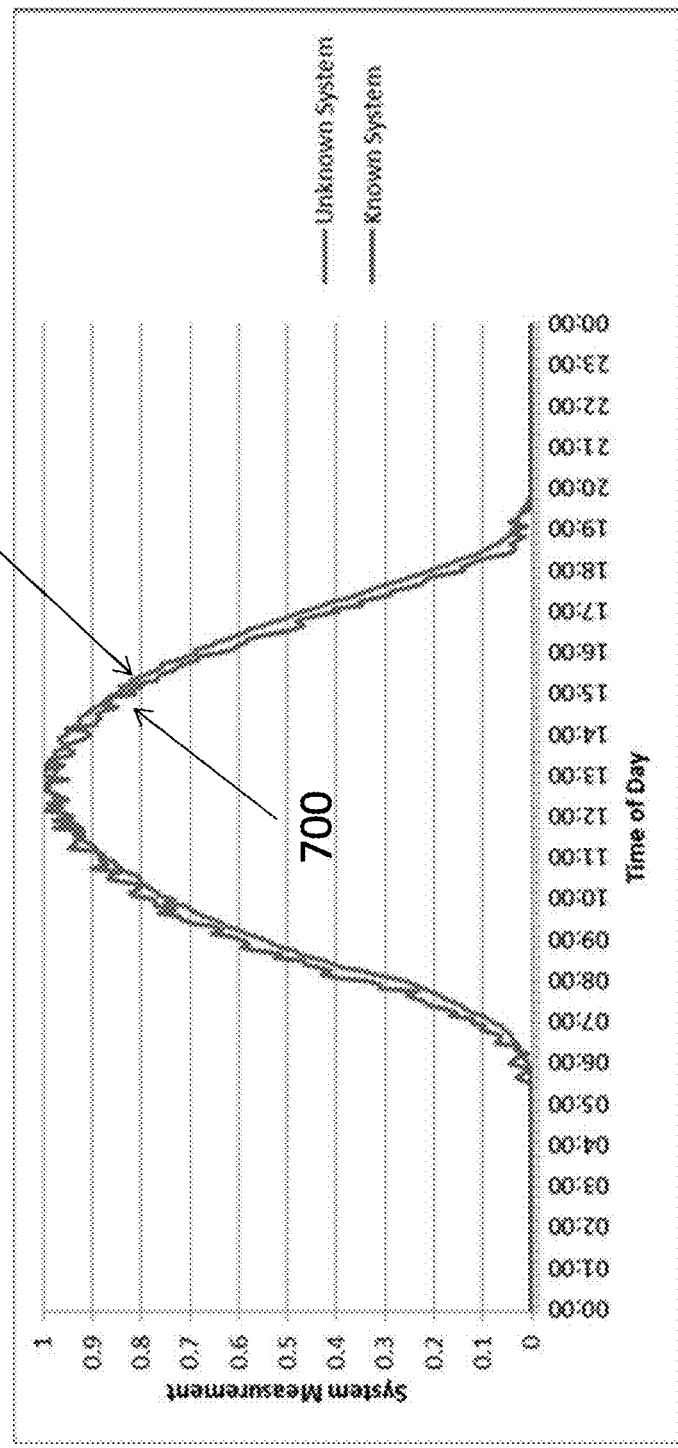
FIG. 10 depicts the present invention.
Figure 11:
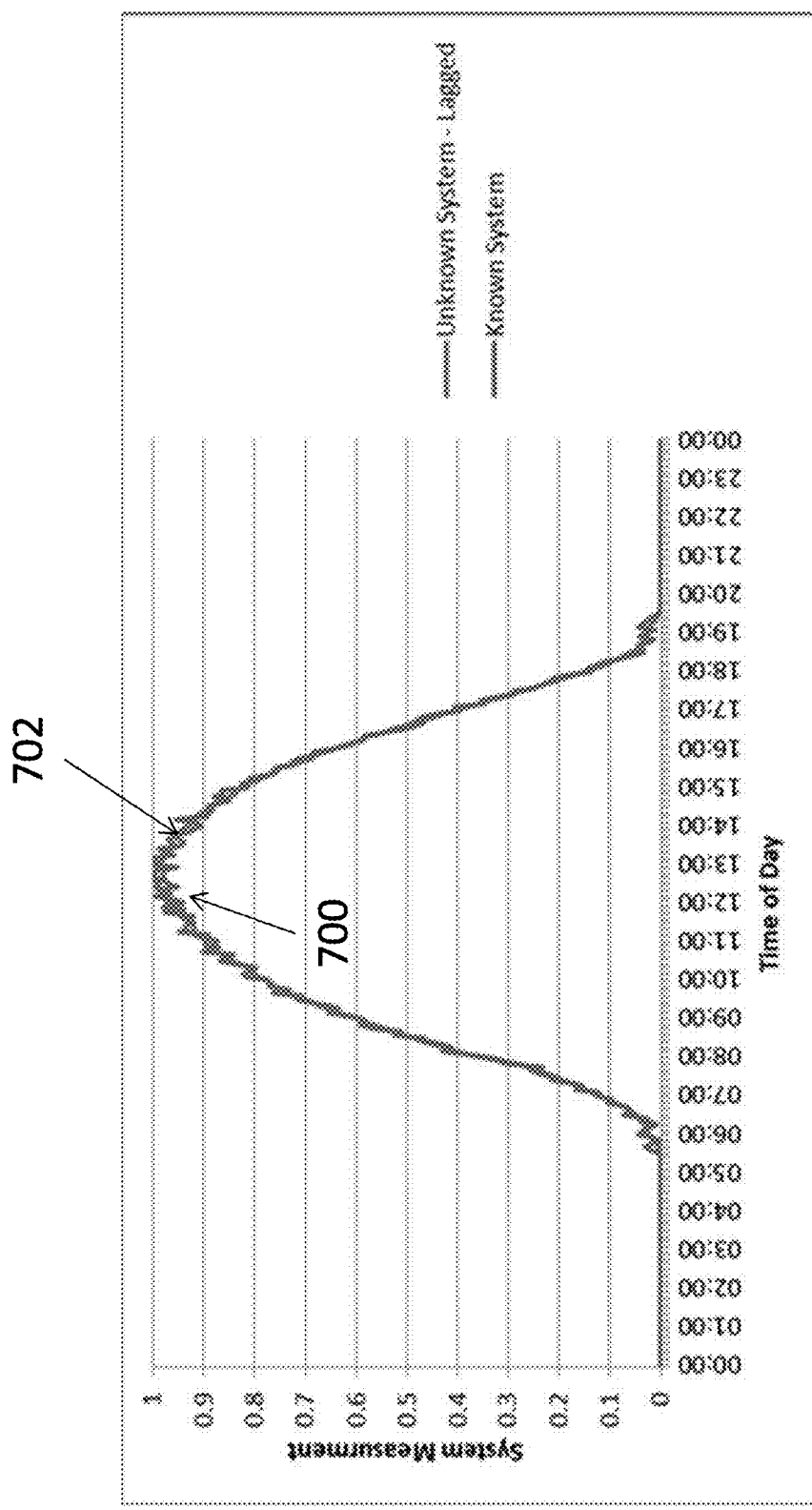
FIG. 11 depicts the present invention.
Figure 12:
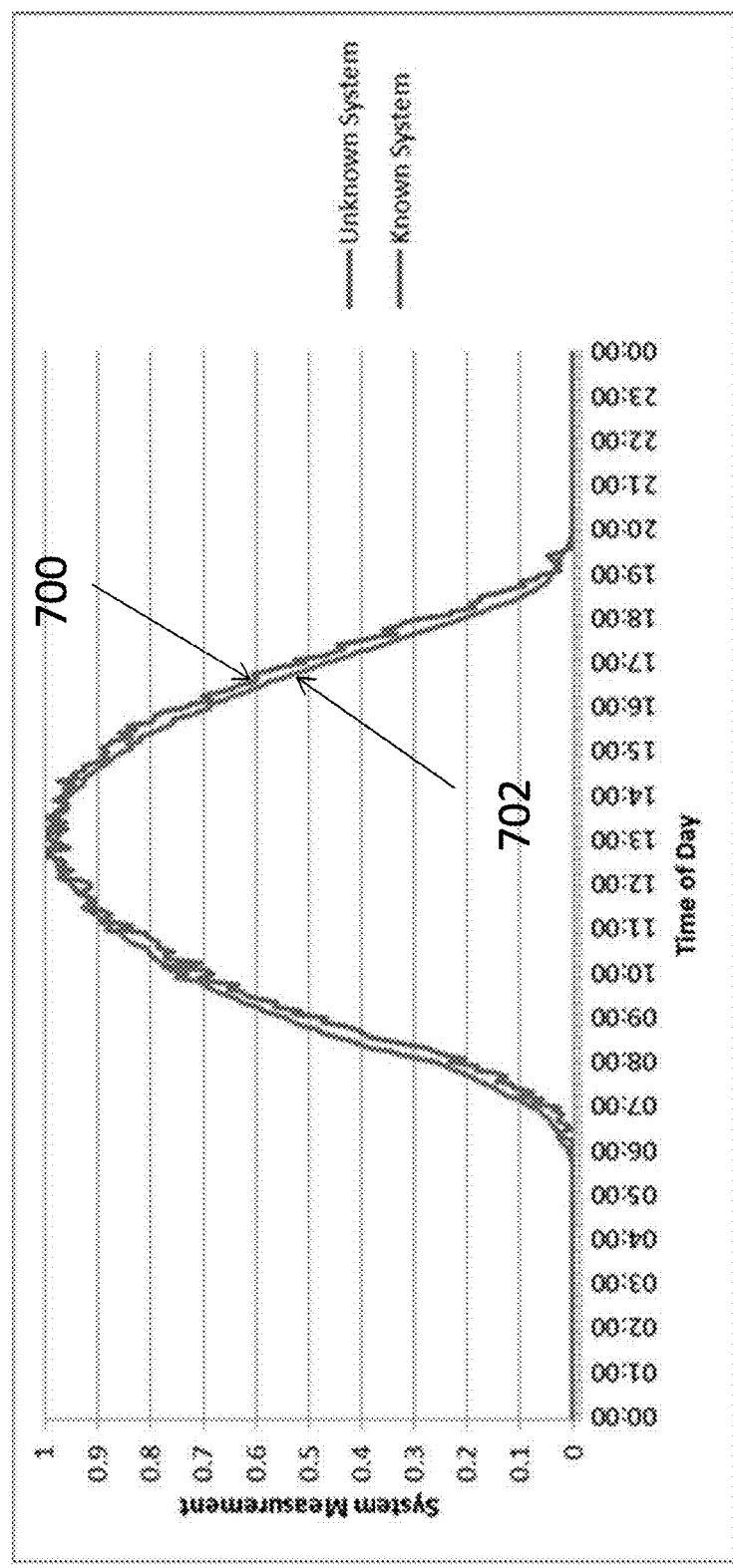
FIG. 12 depicts the present invention.
Figure 13:
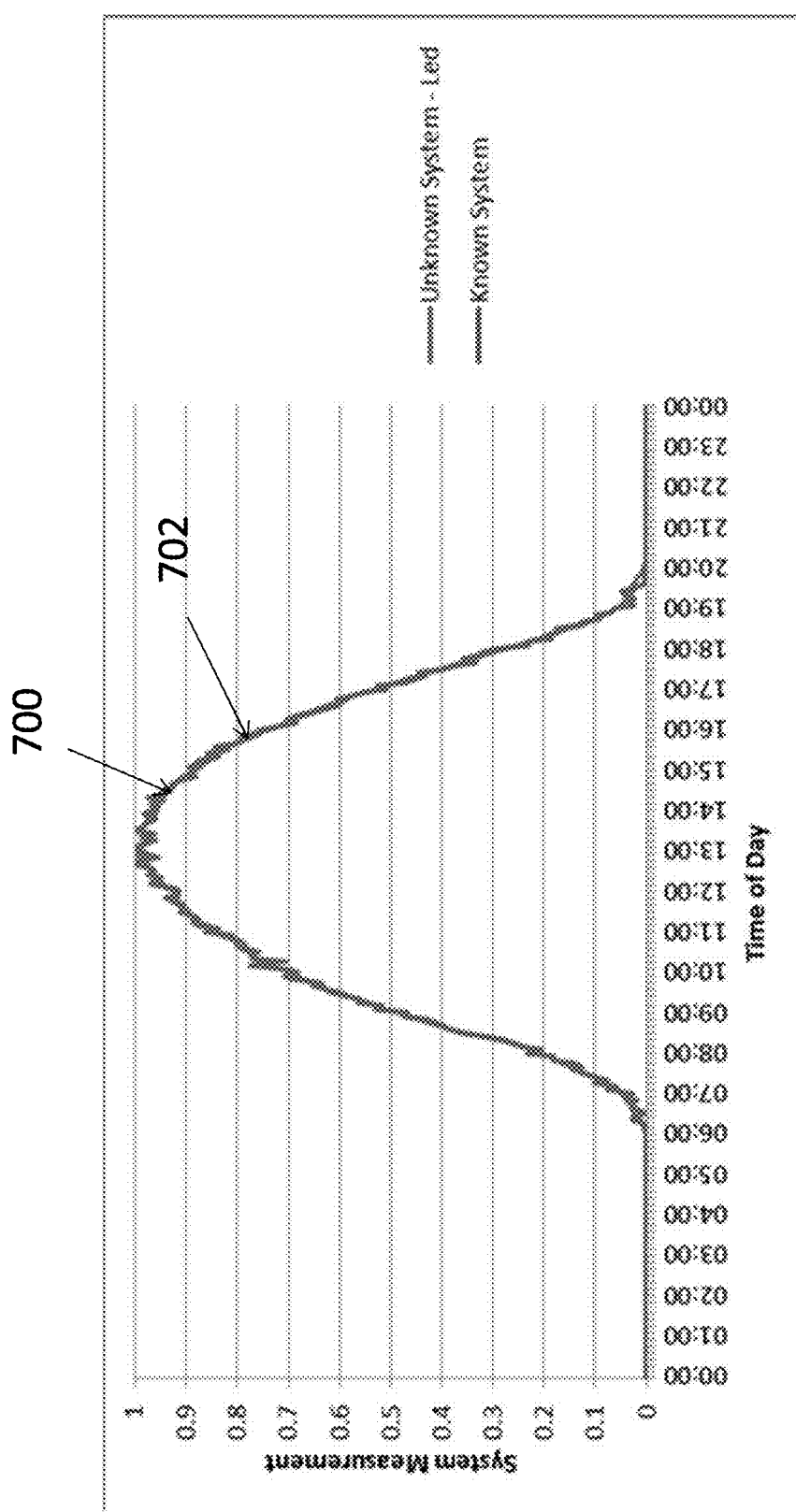
FIG. 13 depicts the present invention.

Another triangulation method may require time leading and lagging date (for longitude). According to this method, n systems are identified with known locations that have a high correlation with the unknown system. Lead or lag data from the unknown system by t minutes to maximize correlation with each of the n known systems, where positive t indicates time leading and negative t indicates time lagging. FIG. 10 depicts an example of an unknown system that requires time lagging to maximize correlation with a known system. FIG. 11 depicts an example of a location unknown system that has been time lagged by 15 minutes (t=−15) to maximize correlation with a known system. FIG. 12 depicts an example of a location unknown system that requires time leading to maximize correlation with a location known system. FIG. 13 depicts an example of a location unknown system which has been time led by 15 minutes (t=+15) to maximize correlation with a known system. For each of the n choose 2 pairs of known systems, solve the system of linear equations. For each of the n choose 2 pairs of known systems, solve the system of linear equations for: longitude$_{unknown\ system}$, where $t_n$ and longitude$_{known\ system\ n}$ are known:

longitude$_{unknown\ system+(t_1)}$*(longitude modifier)=longitude$_{known\ system}$ 1 longitude$_{unknown\ system+(t_2)}$*(longitude modifier)=longitude$_{known\ system}$ 2

Set the unknown system's longitude to the average of the n choose 2 longitude$_{unknown\ system}$ solutions.

Correlation is calculated by taking 2 sets of time series data (in our case from an unknown system and a known system) and calculating Pearson's correlation coefficient using those datasets. Using a computer algorithm we calculate correlation from the formula below, where r is correlation, X is data from one set, and Y is data from the other.

$$r = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}}$$

The correlation based location identification logic is for identifying a renewable energy system's location based on the correlation of the system's energy production with observed or simulated energy production at a known location. This logic can also identify an environmental sensor's location based on the correlation of the sensor's observations with observed or simulated environmental conditions.

Production data could come from, without limitation, PV System (kW or kWh), Solar thermal system (kW or kWh), Concentrated solar power system (kW or kWh) and Wind turbine (kW or kWh). Sensor data could come from, without limitation, Pyranometer (W/m^2 or Wh/m^2), Pyrheliometer (W/m^2 or Wh/m^2), PV reference cell (W/m^2 or Wh/m^2), Radiometer (W/m^2 or Wh/m^2), Pyrgeometer (W/m^2 or Wh/m^2), Anemometer (mph or m/s). This type of data consists of a hardware measurement (units listed beside hardware) and a corresponding point in time or time interval, producing a time series of data (multiple time points and data). For example, monitored PV production data is measured every 5 minutes, resulting in a 1 day dataset containing 288 measurements and timestamp pairs.

The production data may be simulated production data according to environmental conditions at the longitude and latitude pair and the step of correlating by the computer processor each location-unknown renewable energy system to at least one location-known renewable energy system is according to the location-known renewable energy systems longitude and latitude pair and the simulated production data. The environmental conditions at the longitude and latitude pair may be estimated and/or observed.

The renewable energy systems' production data may be selected from the group consisting of photovoltaic system production data, solar thermal system production data, concentrated solar power system production data and wind turbine production data.

A computer processor implemented method of identifying the location of an environmental sensor is provided, the method comprising the steps of; providing a set of environmental sensors having at least two location-known environmental sensors each having a longitude and latitude pair and sensor measurement data; storing the longitude and latitude pair and sensor measurement data in a computer processor; providing at least one location-unknown environmental sensor in a computer processor; correlating by the computer processor each location-unknown environmental sensor to at least one location-known environmental sensor according to the location-known renewable energy systems longitude and latitude pair and sensor measurement data; providing a best-fit location for each location-unknown environmental sensor by triangulating the location-unknown environmental sensor to provide a triangulated latitude and longitude; setting the triangulated latitude and longitude for the location-unknown environmental sensor to become a location-known environmental sensor that is part of the set of renewable energy systems. The sensor measurement data may be simulated sensor measurement data according to environmental conditions at the longitude and latitude pair and the step of correlating by the computer processor each location-unknown environmental sensor to at least one location-known environmental sensor is according to the location-known environmental sensors longitude and latitude pair and the simulated sensor measurement data. The environmental conditions at the longitude and latitude pair may be estimated and/or observed. The sensor measurement data may be selected from the group consisting of pyranometer sensor measurement data, pyrheliometer sensor measurement data, photovoltaic reference cell sensor measurement data, radiometer sensor measurement data, pyrgeometer sensor measurement data and anemometer sensor measurement data.

According to another embodiment, a computer processor implemented method of identifying the location of a renewable energy system is provided, the method comprising the steps of; providing a location-unknown renewable energy system having production data; storing the production data in a computer processor; filtering the production data day by day for favorable weather conditions by a computer processor to provide filtered production data for each filtered day; identifying and saving the start of production, peak of production and end of production for each filtered day in a computer processor; calculating solar noon for each filtered day by a computer processor; calculating longitude bias for each filtered day by a computer processor according to an equation of time and the peak of production; calculating skew of production by a computer processor according to the start of production, peak of production and end of production for each filtered day; calculating longitude for one location-unknown renewable energy system by a computer processor according to the longitude bias and skew of production for each filtered day; setting the longitude for the location-unknown renewable energy system to become a location-known renewable energy system that becomes part of a set of location-known renewable energy systems. The production data may be simulated production data according to environmental conditions at the longitude and latitude pair and the step of correlating by the computer processor each location-unknown renewable energy system to at least one location-known renewable energy system is according to the location-known renewable energy systems longitude and latitude pair and the simulated production data. The environmental conditions at the longitude and latitude pair may be estimated and/or observed. The renewable energy systems' production data may be selected from the group consisting of photovoltaic system production data, solar thermal system production data, concentrated solar power system production data and wind turbine production data.

According to another embodiment, a computer processor implemented method of identifying the location of an environmental sensor is provided, the method comprising the steps of; providing a set of environmental sensors having at least two location-known environmental sensors each having a longitude and latitude pair and sensor measurement data; storing the longitude and latitude pair and sensor measurement data in a computer processor; providing at least one location-unknown environmental sensor in a computer processor; correlating by the computer processor each location-unknown environmental sensor to at least one location-known environmental sensor according to the location-known renewable energy systems longitude and latitude pair and sensor measurement data; providing a best-fit location for each location-unknown environmental sensor by triangulating the location-unknown environmental sensor to provide a triangulated latitude and longitude; setting the triangulated latitude and longitude for the location-unknown environmental sensor to become a location-known environmental sensor that is part of the set of renewable energy systems. The sensor measurement data may be simulated sensor measurement data according to environmental conditions at the longitude and latitude pair and the step of correlating by the computer processor each location-unknown environmental sensor to at least one location-known environmental sensor is according to the location-known environmental sensors longitude and latitude pair and the simulated sensor measurement data. The environmental conditions at the longitude and latitude pair may be estimated and/or observed. The sensor measurement data may be selected from the group consisting of pyranometer sensor measurement data, pyrheliometer sensor measurement data, photovoltaic reference cell sensor measurement data, radiometer sensor measurement data, pyrgeometer sensor measurement data and anemometer sensor measurement data.

According to another aspect of the present invention, a computer processor implemented method of identifying the location of a solar irradiance sensor is provided, the method comprising the steps of; providing a location-unknown solar irradiance sensor having solar irradiance sensor data in a computer processor; storing the solar irradiance sensor data in a computer processor; filtering the solar irradiance sensor data day by day for favorable weather conditions by a computer processor to provide filtered solar irradiance sensor data for each filtered day; identifying and saving the start of production, peak of production and end of production for each filtered day in a computer processor; calculating solar noon for each filtered day by a computer processor; calculating longitude bias for each filtered day by a computer processor according to an equation of time and the peak of production; calculating skew of observation by a computer processor according to the start of production, peak of production and end of production for each filtered day; calculating longitude for one location-unknown solar irradiance sensor by a computer processor according to the longitude bias and skew of observation for each filtered day; setting the longitude for the location-unknown renewable energy system to become a location-known renewable energy system that becomes part of a set of location-known renewable energy systems. The solar irradiance sensor data may be simulated solar irradiance sensor data according to environmental conditions at the longitude and latitude pair and the step of correlating by the computer processor each location-unknown environmental sensor to at least one location-known environmental sensor is according to the location-known environmental sensors longitude and latitude pair and the simulated solar irradiance sensor data. The environmental conditions at the longitude and latitude pair may be estimated and/or observed.

Figure 6:
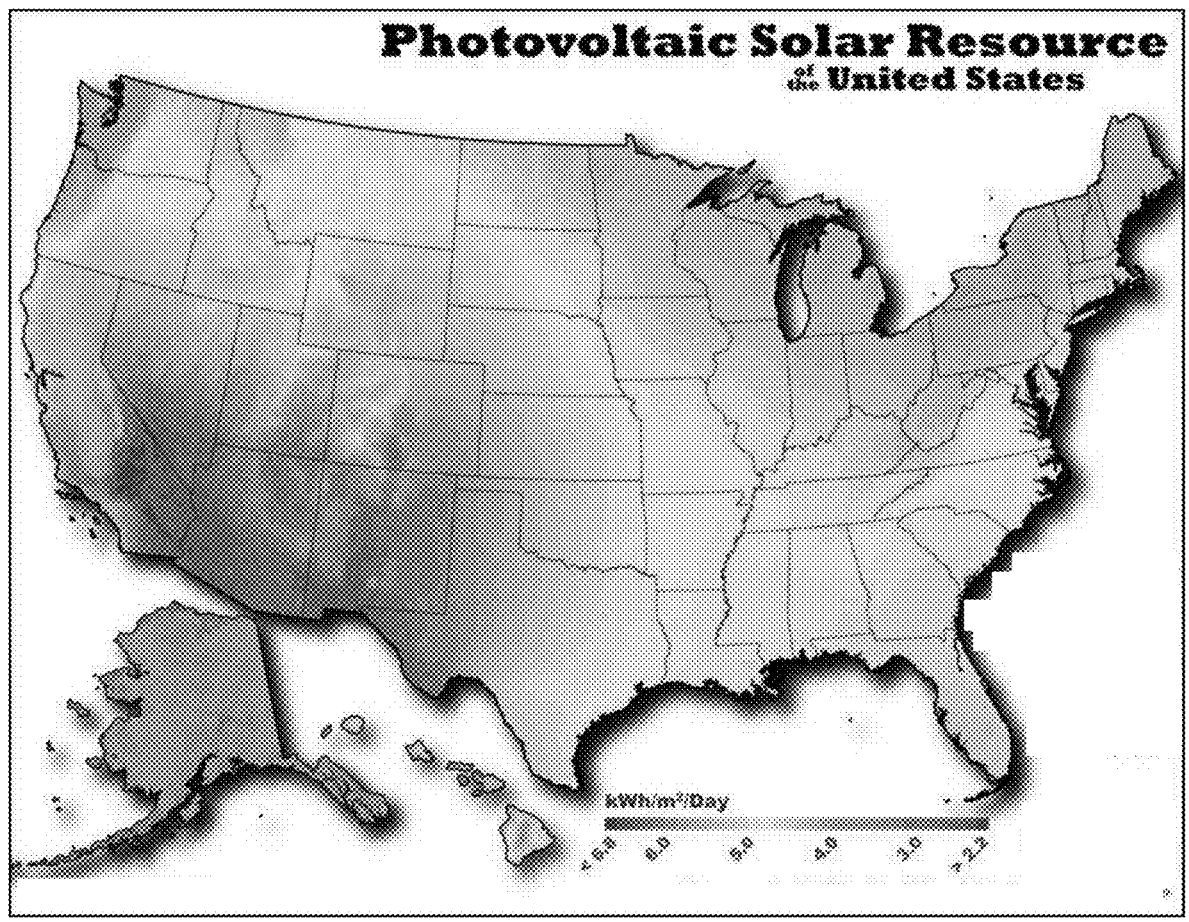
FIG. 6 depicts the present invention.

There may be observation skew based longitude identification logic. This is logic for identifying a PV system's longitude based on energy production skew and solar noon. This logic can also identify a solar irradiance sensor's longitude based on observed solar irradiance skew and solar noon. FIG. 6 depicts an irradiance map. Note that typically, an irradiance map may provide the amount of solar radiation in $kWh/m^2/day$.

The Methodology is comprised of the following, background variables, input parameters and logic based on those variables parameters. There may be a renewable energy system with unknown or incorrect location feed. This is a feed providing production data and time from a renewable energy system with an unknown or incorrect location. Renewable energy systems include, but are not limited to, solar power systems and wind power systems.

There may be an environmental sensor with unknown or incorrect location feed. This is a feed providing environmental condition data and time from an environmental sensor with an unknown or incorrect location. Environmental sensors include, but are not limited to, solar irradiance sensors, wind sensors, and temperature sensors.

There may be a renewable energy project network feed. This is a feed providing data obtained from a network of renewable energy projects. The feed includes individual system level energy production, location, and time among other variables. Renewable energy systems include, but are not limited to, solar power systems and wind power systems.

There may be an environmental sensor network feed. This is a feed providing data obtained from a network of environmental sensors. The feed includes environmental conditions, location, and time among other variables. Environmental sensors include, but are not limited to, solar irradiance sensors, wind sensors, and temperature sensors.

Methods for solving search and optimization problems may include, but are not limited to, brute force search, simulated annealing, and greedy algorithm.

There may be environmental condition models and fees. These are models and feeds that provide data on environmental conditions vital to renewable energy production. This includes, but is not limited to, solar irradiance, wind, and temperature models and feeds.

There may be renewable energy system production models. These are models that simulate the energy production for a variety of renewable energy systems using environmental condition models/feeds. These renewable energy system models include, but are not limited to, photovoltaic, solar thermal, and wind models.

There may be weather filter logic. This is logic that leverages the relationship between favorable weather and high renewable energy production and filters days of production for those days with good weather.

There may be observation event detection logic. This is empirically derived logic for identifying the start, peak, and end of production for a PV system or measurements for a solar irradiance sensor.

There may be solar position calculations. These are theoretical formulas for calculating the position of the sun and solar noon among other variables based on astronomical research.

There may be a correlation based renewable energy project location identification model (network approach). This is the model that utilizes correlation based location identification logic and a renewable energy project network feed in order to identify an unknown or incorrectly located system's latitude and longitude from that system's production feed.

There may be a correlation based environmental sensor location identification model (network approach). This is the model that utilizes correlation based location identification logic and an environmental sensor network feed in order to identify an unknown or incorrectly located sensor's latitude and longitude from that sensor's environmental conditions feed.

There may be a correlation based renewable energy project location identification model (simulation approach). This is the model that utilizes correlation based location identification logic, search problem methods, environmental conditions models/feeds, and renewable energy system production models in order to identify an unknown or incorrectly located system's latitude and longitude from that system's production feed and simulated production data.

There may be a correlation based environmental sensor location identification model (simulation approach). This is the model that utilizes correlation based location identification logic, search problem methods, and environmental conditions models in order to identify an unknown or incorrectly located sensor's latitude and longitude from that sensor's environmental conditions feed and simulated environmental conditions data.

There may be a production skew based PV system longitude identification model. This is the model that utilizes observation skew based longitude identification logic, weather filter logic, observation event detection logic, and solar position calculations to identify an unknown or incorrectly located PV system's longitude from that system's production feed.

There may be an observation skew based solar irradiance sensor longitude identification model. This is the model that utilizes observation skew based longitude identification logic, weather filter logic, observation event detection logic, and solar position calculations to identify an unknown or incorrectly located solar irradiance sensor's longitude from that sensor's environmental conditions feed.

The Correlation Based Renewable Energy System Location Identification Model approach identifies the location of a renewable energy system by finding the systems it is most highly correlated with in terms of energy production. The correlation approach works, because renewable energy systems share the same environmental conditions if they are located in the same area, and they therefore will have similar behavior in terms of output. This correlation holds on a large geographic scale, so we can use the correlation effect to find neighboring renewable energy systems, and therefore to locate a renewable energy system if we have other systems with known locations to start with. Additionally with weather condition data and system production models, "known" locations can be simulated and the aforementioned logic can be applied.

Definition of Variables.

Renewable energy system production=Observed renewable energy system energy generation Environmental conditions=Observed or estimated environmental conditions at a location Simulated renewable energy system production=Simulated renewable energy system energy generation from a renewable energy system production model.

Network Based Model.

1. Calculate correlation of unknown or incorrectly located renewable energy system's production with all known renewable energy systems' production data.

2. Identify a best-fit location based on triangulating on the most correlated renewable energy systems.

3. Set unknown or incorrectly located renewable energy system's latitude and longitude to the triangulated latitude and longitude.

Simulation Based Model.

1. Search through all latitude and longitude pairs.
  a. Estimate or observe environmental conditions at each pair.
  b. Simulate renewable energy system production based on environmental conditions at each pair.

2. Calculate correlation of unknown or incorrectly located renewable energy system's production with all simulated locations system's production data.

3. Identify a best-fit location based on triangulating on the most correlated renewable energy systems.

4. Set unknown or incorrectly located renewable energy system's latitude and longitude to the triangulated latitude and longitude.

Correlation Based Environmental Sensor Location Identification Model.

This approach identifies the location of an environmental sensor by finding the sensors it is most highly correlated with in terms of environmental condition measurements. The correlation approach works, because environmental sensors share the same environmental conditions if they are located in the same area, and they therefore will have similar behavior in terms of measurement. This correlation holds on a large geographic scale, so we can use the correlation effect to find neighboring environmental sensors, and therefore to locate an environmental sensor if we have other sensors with known locations to start with. Additionally with weather condition data and environmental condition models, "known" locations can be simulated and the aforementioned logic can be applied.

Definition of Variables.

Environmental sensor measurement=Observed environmental condition measurements.

Environmental conditions=Observed or estimated environmental conditions at a location.

Simulated renewable energy system production=Simulated renewable energy system energy generation from a renewable energy system production model.

Network Based Model.

1. Calculate correlation of unknown or incorrectly located environmental sensor's measurement with all known environmental sensor measurement data.
2. Identify a best-fit location based on triangulating on the most correlated environmental sensors.
3. Set unknown or incorrectly environmental sensor's latitude and longitude to the triangulated latitude and longitude.

Simulation Based Model.

1. Search through all latitude and longitude pairs.
a. Simulate environmental conditions at each pair.
2. Calculate correlation of unknown or incorrectly located environmental sensor's production with all simulated locations sensor's environmental conditions data.
3. Set unknown or incorrectly located sensor's latitude and longitude to the latitude and longitude of the most correlated simulation.

Production Skew Based PV System Longitude Identification Model. This approach identifies the typical production profile for the PV system, smoothing out variations in performance due to weather patterns. From the typical production profile, one can determine when solar noon occurs for the system. Using astronomical calculations and the time for solar noon, the longitude of the PV system can be determined.

Definition of Variables.

PV system production=Observed PV system energy generation

Production start=Start of PV system energy generation

Production peak=Peak of PV system energy generation

Production end=End of PV system energy generation

Time of productions start (TimeOfStart)=Time of start of PV system energy generation Time of production peak (TimeOfPeak)=Time of start of PV system energy generation Time of production end (TimeOfEnd)=Time of start of PV system energy generation Solar noon=Time of Sun's highest point in sky at a location Day of year=Corresponding day of the year Equation of Time=Difference between and apparent and mean solar time LongitudeBias (LonBias)=Estimated system longitude uncorrected for system orientation Skew=Time difference between start to peak of production and peak to end of production Longitude=Estimated system longitude corrected for system orientation Model.

1. Filter PV production data day by day for favorable weather conditions.

2. Identify start, peak, and end of production each filtered day.
3. Calculate solar noon each filtered day.
4. Calculate longitude bias each filtered day.

$$\text{EquationOfTime} = 60*(0.1645*\sin(2*((2*pi/364)*(\text{DayOfYear}-81))) - 0.1255*\cos(((2*pi/364)*(\text{DayOfYear}-81))) - 0.025*\sin(((2*pi/364)*(\text{DayOfYear}-81)))).$$  a.

$$\text{LongitudeBias} = 180 - 360*\text{TimeOfPeak}/288 - \text{EquationOfTime}/4.$$

5. Calculate skew of production.

$$\text{Skew} = \text{abs}(\text{median}(\text{TimeOfPeak}) - \text{median}(\text{TimeOfStart})) - \text{abs}(\text{median}(\text{TimeOfPeak}) - \text{median}(\text{TimeOfEnd}))$$  a.

6. Calculate longitude and set equal to unknown or incorrectly located system's longitude.

$$\text{Longitude} = \text{median}(\text{LonBias}[\text{all days}]) + \text{Skew}*0.65 + 1.1$$  a.

Observation Skew Based Solar Irradiance Sensor Longitude Identification Model. This approach identifies the typical measurement profile for a solar irradiance sensor, smoothing out variations in performance due to weather patterns. From the typical measurement profile, one can determine when solar noon occurs for the system. Using astronomical calculations and the time for solar noon, the longitude of the solar irradiance sensor can be determined.

Definition of Variables.

Solar irradiance sensor measurement=Observed PV system energy generation.

Observation start=Start of solar irradiance sensor observation

Observation peak=Peak of solar irradiance sensor observation

Observation end=End of solar irradiance sensor observation

Time of observation start (TimeOfStart)=Time of start of solar irradiance sensor observation Time of observation peak (TimeOfPeak)=Time of start of solar irradiance sensor observation Time of observation end(TimeOfEnd)=Time of start of solar irradiance sensor observation Solar noon=Time of Sun's highest point in sky at a location Day of year=Corresponding day of the year Equation of Time=Difference between and apparent and mean solar time LongitudeBias (LonBias)=Estimated sensor longitude uncorrected for sensor orientation Skew=Time difference between start to peak of observation and peak to end of observation Longitude=Estimated sensor longitude corrected for sensor orientation Model.

1. Filter solar irradiance sensor data day by day for favorable weather conditions.

2. Identify start, peak, and end of observation each filtered day.
3. Calculate solar noon each filtered day.
4. Calculate longitude bias each filtered day.

$$\text{EquationOfTime} = 60*(0.1645*\sin(2*((2*pi/364)*(\text{DayOfYear}-81))) - 0.1255*\cos(((2*pi/364)*(\text{DayOfYear}-81))) - 0.025*\sin(((2*pi/364)*(\text{DayOfYear}-81))))$$  a.

LongitudeBias=180−360*TimeOfPeak/288−Equation-
    OfTime/4    b.

5. Calculate skew of Observation.

Skew=abs(median(TimeOfPeak)−median(TimeOf-
    Start))−abs(median(TimeOfPeak)−median(Tim-
    eOfEnd))    a.

6. Calculate longitude and set equal to unknown or incorrectly located sensor's longitude.

Longitude=median(LonBias[all days])+Skew*0.65+
    1.1    a.

The present invention can be used, by way of example, for: locating PV systems; locating solar thermal systems; locating wind systems; locating environmental sensors (e.g., irradiance sensors). These are important as knowing location enables better data from which to build models of performance; there are many situations in which verifying location info could be important: to provide data cleansing of large quantities of data; validate user input. There are also many situations in which automatically discovering location could be important: support smart-grid systems by automatically figuring out the location for a given sensor (because smart-grid assets may not be centrally registered); In data aggregation and re-packaging situations the full registration information may not be available, so location would need to be automatically added to the data sets. For system modeling purposes, where location information may be a critical part of the estimation process (e.g., to forecast system output one may need to assess historical behavior/performance under different weather conditions, so knowing the location allows one to link the performance and weather data together).

1. Latitude and longitude identification of renewable energy systems.
  a. using system energy production.
  b. using an known renewable energy system network.
2. Latitude and longitude identification of environmental sensors.
  a. using observed environmental conditions.
  b. using an known environmental sensor network.
3. Latitude and longitude identification of renewable energy systems.
  a. using system energy production.
  b. using a renewable energy systems' respective production model.
4. Latitude and longitude identification of environmental sensors.
  a. using observed environmental conditions.
  b. using an environmental condition's respective simulation model.
5. Longitude identification of a PV system.
  a. using system energy production.
  b. using solar noon.
6. Longitude identification of a solar irradiance sensor.
  a. using observed solar irradiance.
  b. using solar noon.

Automatic Detection of PV System Configuration.

Distributed solar energy is rapidly growing, and with that growth there is increasing need for software tools to validate data collected on PV system configuration. Clean configuration data is the foundation for most fleet performance modeling analytics, but large-scale deployments' data on location, orientation, and tilt are generally subject to human error. We cover a number of techniques to automatically validate location, orientation and tilt data.

Location detection: Combining three methodologies to determine location is often accurate within 10 miles.

1. Solar noon: By statistically determining a system's solar noon, the system's longitude can be extracted from astronomical calculations.
2. Neighbor correlation: System location can be triangulated by correlating the system's production with production data from a network of solar projects with known locations.
3. Weather & irradiance model simulations: By simulating production using historical weather data and satellite-based irradiance models, an installed system's location can be determined by comparing simulated vs. actual production.

Orientation and tilt detection: Combining two methodologies to determine orientation and tilt provides solid data-quality guardrails.

1. Daily start, peak, and end times: System orientation is indicated by the time difference between start to peak, and peak to end, of a typical system production profile.
2. Weather & irradiance model simulations: Orientation and tilt can be found by comparing actual vs. simulated output from a search through potential orientation and tilt angles.

The present invention provides a process and logic for identifying the latitude and longitude of a renewable energy system based on energy production correlation and an existing fleet of renewable energy projects.

The present invention provides a process and logic for identifying the latitude and longitude of an environmental sensor based on observation correlation and an existing fleet of environmental sensors.

The present invention provides a process and logic for identifying the latitude and longitude of a renewable energy system based on energy production correlation and a renewable energy system production model.

The present invention provides a process and logic for identifying the latitude and longitude of an environmental sensor based on observation correlation and an environmental conditions model.

The present invention provides a process and logic for identifying the longitude of a PV system based on energy production skew and solar noon.

The present invention provides a process and logic for identifying the longitude of a solar irradiance sensor based on observation skew and solar noon.

It should be understood that the foregoing relates to preferred embodiments of the invention and that modifications may be made without departing from the spirit and scope of the invention as set forth in the following claims.

We claim:

1. A computer processor implemented method of identifying a location of a renewable energy system, said method comprising the steps of:
  providing a set of renewable energy systems having at least two location-known renewable energy systems each having a longitude-latitude pair input data and production data;
  storing the longitude-latitude pair input data and production data in a computer processor;
  providing at least one location-unknown renewable energy system having production data in the computer processor
  correlating by said computer processor each of said at least one location-unknown renewable energy system to at least one location-known renewable energy system according to said longitude-latitude pair input data and said production data from said at least one location-known renewable energy system and said production data from said at least one location-unknown renewable energy system;

providing a best-fit location for each of said at least one location-unknown renewable energy system by triangulating said at least one location-unknown renewable energy system to provide a triangulated latitude and longitude;

setting said triangulated latitude and longitude for said at least one location-unknown renewable energy system to become a determined location-known renewable energy system that is part of the set of renewable energy systems; and outputting said triangulated latitude and longitude for said at least one location-unknown renewable energy system to a user to improve efficiency associated with monitoring said determined location-known renewable energy system.

2. The method of claim 1, wherein said production data from said at least one location-known renewable energy system is simulated production data according to environmental conditions at said longitude-latitude pair input data, and said step of correlating by said computer processor each of said at least one location-unknown renewable energy system to said at least one location-known renewable energy system is according to said longitude-latitude pair input data from said at least one location-known renewable energy system and said simulated production data.

3. The method of claim 2, wherein said environmental conditions at said longitude-latitude pair input data are estimated.

4. The method of claim 2, wherein said environmental conditions at said longitude-latitude pair input data are observed.

5. A renewable energy location identification system, comprising:
at least two location-known renewable energy systems coupled to a computer processor, said computer processor configured to store a set of parameters associated with said renewable energy systems, the set of parameters comprising longitude-latitude pair input data and production data; and at least one location-unknown renewable energy system having production data and coupled to the computer processor, said computer processor configured to:

correlate each of said at least one location-unknown renewable energy system to at least one location-known renewable energy system according to said set of parameters, provide a best-fit location for each of said at least one location-unknown renewable energy system by triangulating said at least one location-unknown renewable energy system to provide a triangulated latitude and longitude, set said triangulated latitude and longitude for said at least one location-unknown renewable energy system to become a determined location-known renewable energy system that is part of a set of renewable energy systems with the at least two location-known renewable energy systems, and output said triangulated latitude and longitude for said at least one location-unknown renewable energy system to a user to improve efficiency associated with monitoring said determined location-known renewable energy system.

\* \* \* \* \*